United States Patent
Brindyuk

(10) Patent No.: US 9,485,904 B2
(45) Date of Patent: Nov. 8, 2016

(54) METHOD FOR INCREASING CROP YIELDS

(71) Applicant: Sergei Vladimirovich Brindyuk, Alekseevka (RU)

(72) Inventor: Sergei Vladimirovich Brindyuk, Alekseevka (RU)

(73) Assignee: Sergei Vladimirovich Brindyuk, Alekseevka (RU)

( * ) Notice: Subject to any disclaimer, the term of this patent is extended or adjusted under 35 U.S.C. 154(b) by 0 days.

(21) Appl. No.: 14/731,502

(22) Filed: Jun. 5, 2015

(65) Prior Publication Data

US 2015/0264860 A1  Sep. 24, 2015

Related U.S. Application Data

(63) Continuation of application No. PCT/RU2013/001048, filed on Nov. 22, 2013.

(30) Foreign Application Priority Data

Dec. 6, 2012 (RU) ................................ 2012152715

(51) Int. Cl.
*A01B 79/02* (2006.01)
*A01C 21/00* (2006.01)
*A01B 79/00* (2006.01)

(52) U.S. Cl.
CPC ........... *A01C 21/005* (2013.01); *A01B 79/005* (2013.01); *A01B 79/02* (2013.01); *A01C 21/00* (2013.01)

(58) Field of Classification Search
CPC .... A01B 79/005; A01B 79/00; A01B 79/02; A01C 21/00; A01C 21/005
See application file for complete search history.

(56) References Cited

U.S. PATENT DOCUMENTS 3,854,403 A * 12/1974 Bliss .................. B60V 3/04
104/134

FOREIGN PATENT DOCUMENTS

| RU | 1787332 A1 | 1/1993 |
| RU | 2297748 C1 | 4/2007 |
| RU | 2358428 C1 | 6/2009 |
| RU | 2445763 C1 | 3/2012 |
| SU | 913962 A1 | 3/1982 |

OTHER PUBLICATIONS

International Search Report in counterpart International Application No. PCT/RU2013001048, mailed Apr. 24, 2014.

* cited by examiner

*Primary Examiner* — Christopher J Novosad
(74) *Attorney, Agent, or Firm* — Edell, Shapiro & Finnan, LLC

(57) ABSTRACT

Among the problems in achieving high yields of sown crops in agricultural production are the timely sowing thereof, maintaining moisture in the soil and environmental friendliness. In the disclosed method for increasing crop yields, including in naturally handicapped areas, the method optimizes sowing times, carrying out the sowing in wet soil which is in a saturated and/or muddy state, during or immediately following rain or directly following the thawing of a snow cover. A sowing assembly travels at a rate of between 1 and 60 km/hour, and the load-bearing portion for the sowing assembly is a utility vehicle operating with a pressure on the soil of 0.4 kgf/cm2 or lower, and as low as zero, e.g., a "Bars UTES 271" having elastic tire-covers or an air cushion. The seeds are buried directly under the layer of over-wet soil and the burial depth is between 0.2 and 15 cm.

4 Claims, No Drawings

METHOD FOR INCREASING CROP YIELDS

CROSS REFERENCE TO RELATED APPLICATIONS

This is a Continuation of International Application PCT/RU2013/001048, which has an international filing date of Nov. 22, 2013, and the disclosure of which is incorporated in its entirety into the present Continuation by reference. The following disclosure is also based on and claims the benefit of and priority under 35 U.S.C. §119(a) to Russian Patent Application No. RU 2012152715, filed Dec. 6, 2012, which is also incorporated in its entirety into the present Continuation by reference.

FIELD OF THE INVENTION

The invention relates to agricultural production, specifically to the production of crops which are sown, and can be used, inter alia, in areas where agriculture is associated with certain risks.

BACKGROUND

Among the problems in achieving high yields of such crops are the timely sowing thereof, maintaining moisture in the soil and increasing the yield of the crops combined with ensuring maximum environmental friendliness of the produced goods.

Weed control is, as a rule, carried out by way of soil cultivation prior to sowing. However, this method does not always provide satisfactory results since only well-rooted weeds are removed by cultivation. Those plants whose seeds have only just started to germinate without forming a root system will also continue to grow after cultivation. Postponing the soil cultivation (taking into account the highest germination ability of the weeds) is not expedient from an agrotechnical point of view, since there are optimal time periods for sowing certain crops, which significantly affect the crop yields. Moreover, the process of land cultivation is also associated with an intensive depletion of the spring soil moisture reserves, which is also an unfavorable factor.

A method of increasing crop yields which includes loosening the soil and applying fertilizers (see patent RU 2 358 428), is known in the art.

A further method of increasing crop yields which includes loosening the soil, applying fertilizers, and optimizing sowing times (see patent RU 2 445 763, prototype), is also known in the art.

The common drawbacks of the known methods are their high prime costs, the complexity of the processes and the low levels of environmental friendliness due to the considerable amount of inorganic fertilizers being applied to the cropland. These have an adverse effect on the soil microflora and decrease the humus.

SUMMARY

An object of the proposed invention is to eliminate these disadvantages, and in particular to simplify the process of increasing crop yields, to reduce its prime costs and to increase environmental friendliness.

This object is achieved in that in the specific method for increasing crop yields, inter alia in areas where agriculture is associated with certain risks, sowing times are optimized, sowing is carried out in wet soil which is in a saturated and/or muddy state, possibly while it is raining, immediately following rain or directly after snowmelt, where a sowing assembly travels at a speed of between 1 and 60 km/hour, and where the load-bearing portion for the sowing assembly is a utility vehicle capable of operating with a pressure on the soil of 0.4 kgf/cm2 (kilogram-force per square centimeter) or less, down to zero, for instance a "Bars UTES 271" having elastic tire covers or an air cushion, and where seeds are buried directly under the layer of saturated soil at a burial depth of between 0.2 and 15 cm.

The entirety of these features makes new properties possible, i.e. by applying these features it is possible to simplify the process of increasing crop yields, to reduce its prime costs and to increase environmental friendliness. These features permit decreasing the amount of or even completely refraining from using fertilizer, even while achieving the same or higher crop yields).

DETAILED DESCRIPTION

The best way to implement the proposed invention is as follows.

The soil condition at the time of sowing should be significantly moister than the moisture level of physically mature soil (muddy, preferably after or during rain), which considerably reduces the friction and resistance of the coulters of the sowing assembly on the soil and results in a reduction of the energy costs for sowing. The utility vehicle (sowing machine carrier) used has to be a device capable of moving at a pressure on the soil of 0.18-0.2 kgf/cm2. Thus, it does not create ruts on the field to be sown, but the soil contact is sufficient for operation of the sowing assembly. (Air-cushion devices seem better as regards reducing the impact on the soil, but they are much worse in terms of energy costs). In this respect, one of the best utility vehicles (as regards the criteria of "energy costs"—"pressure on soil") is "Bars UTES 271" with elastic tire covers (background description thereof not forming part of the present disclosure is available at, e.g., http://barsagro.ru/utes bars 271). Sowing is carried out with the sowing assembly traveling at a speed of 35-40 km/h, at a sowing depth of 3-3.5 cm under the layer of saturated soil (under such conditions of movement, small irregularities of the field to be sown are easily compensated).

The criterion of "industrial applicability" is fulfilled as shown by the example given below of the specific use of the proposed invention.

The proposed method of increasing sown crop yields was tested in the farm "CJSC named after S. M. Kirov" in the Veydelevsky district of the Belgorod region. To increase the reliability of the experiment, a field with a total area of 123 hectare (ha) was divided into two sections. The first section of the field was cultivated in a traditional way; the second one was cultivated using the invention.

Both according to the inventive method and conventional method, the soil was prepared in autumn, including plowing and the elimination of weeds. However, in springtime the seeds were placed into the soil fully saturated with moisture directly after snowmelt, with the sowing assembly traveling at a speed of 40 km/h, the load-bearing portion for the sowing assembly being a utility vehicle capable of operating with a pressure on the soil of approximately 0.2 kgf/cm2, i.e. a "Bars UTES 271" (having elastic tire covers), the seeds being buried directly under the layer of saturated soil at a burial depth (in accordance with agrotechnical requirements) of 3 cm.

The sowing operations in the field section cultivated using the inventive method were completed 18 days earlier than with the conventional method.

It is to be noted that it did not rain at all in the area of this field over the entire summer period. The soil was covered with deep cracks in this section.

The crop yield in the field section cultivated according to the inventive method amounted to 22.39 dt/ha (dt/ha=100 kilograms per hectare), and to 9.1 dt/ha in the section cultivated conventionally. Thus, the difference in crop yield was 13.29 dt/ha (the results are confirmed by the respective report).

The proposed method was additionally tested in "Rusa-gro-Invest" LLC on a field having an area of 108 ha. The harvesting results showed that the yield of the crop cultivated according to the proposed method was 24.1 dt/ha while the average yield of the farm was 16.2 dt/ha. The difference in crop yield was 7.9 dt/ha (the results are confirmed by the respective report).

Thus, the proposed method:
  enables increasing crop yields;
  reduces weather effects on the yields;
  increases the environmental friendliness of the process; and
  increases saving of resources when cultivating crops.

The fuel consumption of "Bars UTES 271" is 0.2 l/ha (liters per hectare) and the cost of fuel used per shift is 1692 rubles, while the fuel consumption of the self-propelled sprayer John Deere 4930 is 1.2 l/ha and the cost of fuel used per shift is 5200 rubles).

What is claimed is:

1. A method for increasing crop yields, through optimization of sowing times, comprising:
  sowing crop seeds in soil, which is in a moisture-saturated state, with a sowing assembly traveling at a speed of between 1 and 60 km/hour,
  wherein a load-bearing portion of the sowing assembly is a utility vehicle operating with a pressure on the soil of between zero and 0.4 kgf/cm$^2$ (kilogram-force per square centimeter), and
  wherein seeds are buried directly under a layer of the wet soil, such that a burial depth of the seeds is between 0.2 and 15 cm.

2. The method according to claim 1, wherein:
  the sowing is performed during rainfall, immediately following a rain or directly after a snowmelt.

3. The method according to claim 1, wherein:
  the sowing assembly is a vehicle configured to operate with a pressure on the soil of at most 0.2 kgf/cm$^2$.

4. The method according to claim 1, wherein:
  the load-bearing portion comprises elastic tire covers or an air cushion.

* * * * *

UNITED STATES PATENT AND TRADEMARK OFFICE
CERTIFICATE OF CORRECTION

| | | |
|---|---|---|
| PATENT NO. | : 9,485,904 B2 | |
| APPLICATION NO. | : 14/731502 | |
| DATED | : November 8, 2016 | |
| INVENTOR(S) | : Sergei Vladimirovich Brindyuk | |

It is certified that error appears in the above-identified patent and that said Letters Patent is hereby corrected as shown below:

In the Claims
Column 4, Lines 14-15, in Claim 1: remove "the wet soil" and insert --the soil in the moisture-saturated state--.

Signed and Sealed this
Fourteenth Day of February, 2017

Michelle K. Lee
*Director of the United States Patent and Trademark Office*